Dec. 30, 1930.    O. MUEHLEN    1,786,444
PROCESS FOR TREATING MILL BAND SAWS
Filed June 17, 1927
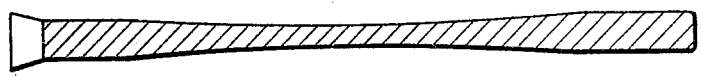
FIG. 1.
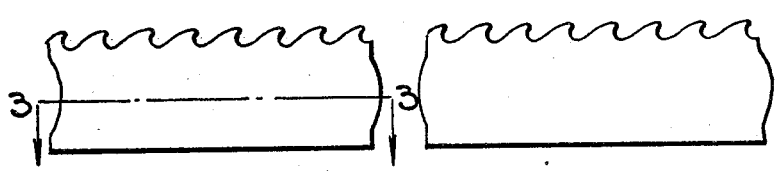
FIG. 2.
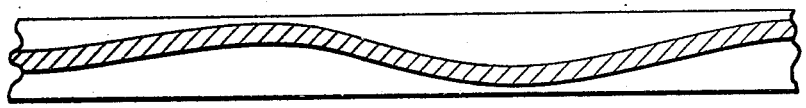
FIG. 3.
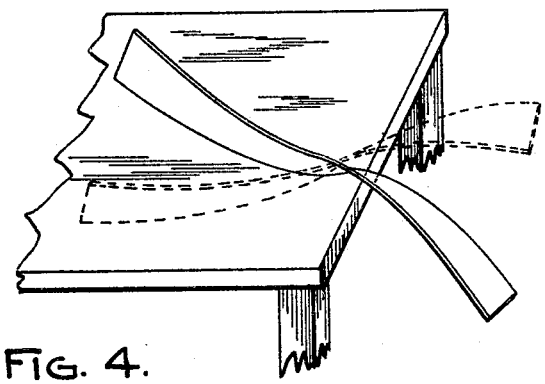
FIG. 4.
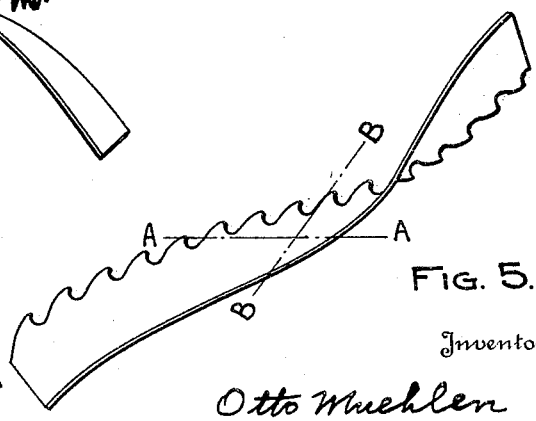
FIG. 5.
FIG. 6.
Inventor
Otto Muehlen
By Rolland S. Pratt
Attorney Patented Dec. 30, 1930

1,786,444

UNITED STATES PATENT OFFICE

OTTO MUEHLEN, OF DENVER, COLORADO

PROCESS FOR TREATING MILL BAND SAWS

Application filed June 17, 1927. Serial No. 199,552.

My invention relates to a process to be used in the manufacture and in the repair of mill band saws.

Large mill band saws as now sold on the market are not guaranteed for even one minute of service. When a saw is new it can never be worked like an old saw. It is used for a few minutes at a time, and after each few minutes of service it is taken to the leveling slab or anvil and there carefully worked over by the saw filer using various hammers, till as far as he can see the saw is in a condition of equal internal stress.

When after careful nursing of the new saw it is finally considered in proper condition it is then put into long hard service. But this can never be done with any saws now on the market till after this long and careful hand work and repeated inspections by the saw filer.

The process is purely a hand process, where the expertness of the saw filer alone is responsible for the final good serviceable condition of the saw.

If a mill band saw is to operate properly, most the pull must come upon the front and the rear edges of the blade; this keeps the saw running straight between the wheels. The front or toothed edge of the saw must carry slightly more of the pull than the rear edge of the saw; that is the toothed edge must be slightly shorter than the rear edge, and both edges must be shorter than the central strip.

The saw is "tensioned", as it is called, that is, made so the edges take the tension, by rolling the central strip so it is actually longer than the edges.

When the saw is operating under the pull or tension of the wheels the two edges are stretched so tight that the loose central strip is pulled practically straight also.

If the skin of one side of one edge is longer than the skin on the other side of that edge what is called a "ruffled edge" results.

If a spot on a saw has a longer skin on one side than on the other side what is called a "lump" is formed.

If the skin of both sides of a spot on a saw is too long, that is, longer than the surrounding skin, a "loose place" is formed.

Grinding both sides of a "lump" or of a "loose place" in the manufacture or repair of a saw, till they are parallel, makes the saw look all right, but does not correct the uneven fibre stress of the material which is the cause of such imperfections.

If a saw jumps out of a cut because of overfeeding or striking iron or other hard foreign substances, the curved path it must then follow because of the bottom saw guide will stretch the outer face of the saw as it follows the curved path so that it will coil up like a clock spring if the saw is cut in two. But, if this stretching of one face has taken place in such a way that the saw will coil in a spiral, when cut in two, it is called "twisted".

But, whatever the imperfection, and whether it is due to the processes of manufacture or to accidents in service, or to the work of repair men, the result is broadly the same in that the fibre stress of the material of the saw is not equalized.

Entirely aside from the processes of manufacture, the material of the saw in the first place may be the cause of inequalities in the finished saw.

For instance, in rolling a long round billet of steel the material is most compressed on the vertical plane through the center of the billet; the material near the surface of the billet and along the horizontal plane through the center of the billet is not compressed to any great extent till the center portion of the billet has been compressed enough to turn the round billet into a flat slab. Also, a difference in the feed of the cooling water to the rolls, or of the amount that strikes the billet itself, may tend to make hard places or thick places, which may in part account for the lack of uniformity in the finished saw.

But, whatever the cause, the final fact is that the material of a new saw is not uniform.

Therefore, the object of my invention is to provide a process whereby a mill band saw may be manufactured at the factory and when finished will have equalized fibre stress equal to that of a saw that has been properly seasoned by service and by careful working over in the hands of a competent saw filer.

A further object is to provide a process whereby the material of a saw may be evenly stretched more and more till all its fibres are under the same tension.

A further object is to provide a process whereby the shorter or tighter portions of the saw may be stretched evenly and progressively till they are of the same length as portions which were originally longer and therefore looser.

A further object is to provide a process whereby the saw may be subjected to stretching progressively till its entire material is in a uniform unwarped and unstrained condition with all fibre stresses equalized.

A further object is to provide a process whereby a saw may be put into proper condition as to its internal stresses whether the saw is in process of manufacture or is being repaired after use or damage.

I attain the above objects by stretching the entire length of the saw till the length of all portions equals the length of the portions which were originally the longest, and till the fibre stress throughout the saw is therefore equalized. This process is described more in detail below and is in part shown in the drawings in which:—

Figure 1 shows an exaggerated section of a saw, the central strip being thinner and slightly longer than the two edges so the two edges will take the most of the pull of the saw when it is in operation.

Figure 2 shows an exaggerated view of the free ends of a saw after it has been cut in two by a straight cross cut.

Figure 3 is an exaggerated section on the line 3—3 of Figure 2, showing the waves due to the looseness of the metal of the central strip after the saw has been "tensioned" by the compression and consequent elongation of the central strip.

Figure 4 illustrates a strip of paper being pulled over a table edge thereby stretching the outer face of the paper in much the same manner as is employed in my process.

Figure 5 shows a portion of a "twisted" saw.

Figure 6 is a diagrammatic representation of rolls which may be used to bend thin metal to curves as desired.

When a saw blade is bent the outer face is stretched and the inner face tends to be compressed. If then the same blade is bent in the reverse direction, the face which was formerly stretched is put under compression but compresses very little, while the face formerly under compression is stretched. If the bends in opposite directions are properly proportioned the two faces after the two bendings will be of equal length but both will be slightly longer than originally. If this has been known to saw makers and repairmen, at least it has never yet been made use of. Now, if in addition to a single stretching of both faces, the saw is again bent in both directions as before, the two faces will again be of equal length, but the saw will be longer still.

If this process is repeated again and again as long as necessary, the amount the saw is finally stretched will be enough so that subsequent stretchings will begin to stretch even the "lumps" and the "loose places" in the saw, and from that time on subsequent stretchings will stretch every particle of the saw equally, and hence the entire saw will have its internal stresses equalized.

The amount of stretch obtained in this way is of course not large, but it is certain, as can be proven by anyone with a strip of heavy bond paper as illustrated in Figure 4. If the paper is first carefully marked with two marks say ten inches apart and then pulled over the sharp edge of a table several times with alternate reversals moving square with the edge, it will be seen that the marks are then slightly more than ten inches apart. If one side of the paper is stretched more than the other the strip will tend to coil up like a clock spring.

If the strip is pulled over the table edge diagonally and one face stretched more than the other the strip will coil up in a spiral, which is similar to what is called a "twisted" saw.

In any case, the strip of paper may be made flat and straight again by properly pulling it over the table edge so that the opposed faces are of equal length and so that the fibre stresses throughout the strip are equalized.

In my process for mill band saws bending rolls such as shown in Figure 6 are employed. This is a well known type of rolls which is used in straightening or bending saws or other thin metal pieces.

Rolls A and B are cylindrical and are geared together and are called gripping or tractor rolls, the distance between them being adjustable to adjust the grip on the saw, and the upper roll A being quickly removable for the easy insertion of the saw.

The roll C is adjustable in position whereby the amount of bend to which the saw is subjected may be set as desired.

For repair work, the rolls should be provided with grooves to take the extra thickness of the swaged teeth of the saw, though the saw will have to be swaged again if it is "twisted" so that it must be run through the rolls diagonally.

As shown in Figure 6, the saw D, as it passes through the rolls will have one of its faces stretched, so that if cut in two the saw would coil up like a clock spring. This stretching of one face of the saw blade will of course not stretch the material of that entire face, but will stretch the material only where it is already under tension or in a neutral condition. The portions of the saw face that are under compression, such as a bulge that has been flattened, will not be stretched, at least generally not on the first passage through the bending rolls.

After the entire length of the saw has passed through the rolls it is taken off and turned over and put through the rolls again.

This second passage through the rolls will stretch the other side of the saw and if the setting of the roll C for the second passage has been correct the two faces will be balanced.

But, in order to perfectly equalize the fibre stress over the entire saw it will generally have to be reversed again and again, stretching first one side and the other each a little at a time, so as not at any time to fracture the material at any point.

This repeated operation will make the saw slightly longer just as it does the strip of paper, but in doing this a condition is finally reached where even the "loose places" or ruffled places in the saw are being subjected to stretching, which puts the fibres of the entire saw under the same conditions and equalizes the strains throughout. The saw should generally in any case be passed through the bending rolls an even number of times.

As can be demonstrated with a short straight section of saw, if the amount of bending in opposite directions is properly proportioned, especially the last passage, the saw will be perfectly flat and straight after the last passage through the rolls.

For the last reversal and passage through the rolls, the bending roll C should be lowered substantially half the amount it is above the zero curvature position so that the set taken by the material will be substantially half the amount on the last passage as on the passage next preceding.

But, to make my process easier for ordinary workmen to obtain perfect results it is better to reduce the amount the saw is bent toward the end of the process. That is, for the last few reversals of the process. By this means the greatest possible lack of balance between the two sides will be reduced in the same proportion as the reduction in the amount of bending done by the rolls. This not only makes it easier for a good man to do a perfect job but makes it impossible for even a poor man to do a really poor job.

Any good saw filer will soon learn not only the proper size and setting of bending rolls for each thickness and size of saw handled, but will also learn how many passages through the bending rolls should be employed for the best results under all conditions, and how much and for how long the reduction in the amount of bending should be used for the best final results.

There are four methods in which my process of equalizing fibre stresses may be used in the manufacture of saws, which are as follows:—

1st. The blade may be put through the bending rolls directly after it has been hardened, and in place of being put through the flattener.

2nd. The blade may be put through the bending rolls directly after it has been put through the flattener.

3rd. The blade may be put through the bending rolls just before it is delivered to the benchman, and after it has been hardened, flattened, ground, the teeth cut, and the saw brazed and polished.

4th. The blade may be put through the bending rolls in place of being put through the flattener, and again put through the bending rolls just before being delivered to the benchman.

But, however my method is employed, it brings the saw to the benchman not only in a perfectly level condition, but with an even thickness throughout and with a perfect equality of fibre stress throughout. As a result of this, when the benchman comes to put the tension in the saw, he may treat it as a whole, set his stretcher rolls for a certain pressure and run the entire saw through the rolls with that setting, as all sections are alike, and may be treated alike. This is entirely different from present conditions and methods of manufacture.

The benchman will have no hammer and anvil work to do at all, and the finished saw will not only be outwardly right but internally equalized. Such a saw will go right to work in a mill just like present saws that are old and have been carefully worked in as mentioned above. In fact a saw made by this method will be a better saw than any saw manufactured by the old process, which is the only process now in use, and no matter how carefully it has been worked in, for the reason that the old saw manufactured under present methods and processes can not be of uniform thickness after going through the spotty and localized treatment of the hammer and anvil method of equalizing the fibre stresses. My process makes possible for the first time a new saw good enough to be guaranteed by the manufacturer.

My process of equalizing fibre stresses will not only give the desired results when used at the factory as explained above, but its results are just as satisfactory when used at the mill in repair work.

Accidents, carelessness, iron or stone in a log, over-feeding, and many other factors may cause injury to saws, and once a saw has been injured its two sides must be balanced and its fibre stresses equalized again before it can be tensioned and before it will do as good work as formerly.

In the case of stretching either side of a saw without twist, the treatment is the same as that to be used in the factory during manufacture of the saw; including the tensioning operation which should follow if needed, and it usually is.

In case the saw is twisted, however, it should be treated in the same manner described in regard to the twisted strip of paper; that is, the saw should be run through the bending rolls at the proper bend to stretch the shorter side of the saw till it perfectly balances the other side. That is, if the saw is twisted as shown by the full lines in Figure 4, it should be put through the bending rolls just as if it were being manufactured in the first place. This will stretch the short edge of both faces of the saw till both edges of both faces are of equal length, which removes the twist. That is, the saw should be repeatedly run through the rolls till the two sides are again balanced, just as described above for the operation at the factory. When the saw has thus been balanced and leveled the proper tension may again be restored by the saw filer by the use of the stretcher rolls the same as originally done by the benchman at the factory.

In case a saw has too great center tension, that is, the two edges of the saw are too short, it may be put through the bending rolls an even number of times with the proper amount of curvature, which is to be properly decreased for the last passage, and reduced still further subsequently if desired, and the saw can thereby be made to have the smaller amount of tension desired and will still be in a level condition. That is, the edges of such a saw may be stretched evenly which will make up for the too great amount of rolling of the center strip and its consequent too great length.

I am well aware that there are many modifications possible in my process both in sequence of operations, in the degree and proportions of some of the operations, and in some of the operations themselves. But, I consider all such modifications and alterations no more than would readily be perceived by any intelligent and experienced saw filer once my process had been disclosed to him.

So, I do not wish to confine myself narrowly to the exact description as disclosed, but what I claim as new and wish to protect by Letters Patent is as follows:—

1. The process of equalizing the strains in a band saw by bending, consisting of passing the saw repeatedly through rolls composed of two gripping and one bending roll and alternately reversing the upper and the lower faces thereof and thereby alternately stretching first one side and then the other side of the saw and reducing the amount of such stretching for the final one or more of such complete operations.

2. The process of alternately stretching the two faces of a saw by passing it repeatedly through rolls adapted to bend the saw and decreasing the amount of such bending for one or more of such complete operations.

3. The process of passing a band saw through rolls adapted to bend the saw and reversing the direction of bend on alternate bends and decreasing the amount of the bend after one or more of such complete operations to balance its two sides and thereafter putting tension in the edges by compression of the intermediate metal.

4. The process of equalizing the strains in a band saw by alternately stretching first one side and then the other side of the saw by bending its entire length alternately in the reverse direction and repeating the alternate bending while decreasing the amount thereof.

5. The process of bending a band saw through its entire length in one direction to equalize the fibre stress in one face thereof and of bending its entire length in the reverse direction to equalize the fibre stress in the other face thereof and repeating the double bending while decreasing the amount thereof, and thereafter putting tension in the edges of the saw blade by compression of intermediate metal.

6. The process of equalizing the strains in a band saw by bending consisting of passing the saw repeatedly through rolls composed of gripping and bending units and alternately reversing the upper and lower faces thereof and thereby alternately stretching first one side and then the other side of the saw and reducing the amount of such stretching for the final complete bending operation to substantially one half the amount of the former bending operation.

7. The process of alternately stretching the two faces of a saw by passing it repeatedly through rolls adapted to bend the saw and decreasing the amount of such bending on the last passage through the rolls to substantially one half the amount of the former passage through the rolls.

8. The process of equalizing the strains in a band saw by passing the saw through rolls adapted to bend the saw and reversing the direction of bend on alternate bends and thereby alternately stretching first one side and then the other side of the saw a predetermined amount and after one or more of such complete operations reducing the amount of such bending and stretching by substantially one half of the former amount for a final complete bending operation and thereafter putting tension in the two edges of the saw blade by compression of the intermediate metal.

9. The process of equalizing the strain in a band saw by alternately stretching first one side and then the other side of the saw by bending alternately in the reverse direction and on the final bending reducing the amount of bend to substantially one half the amount of the next preceding bend.

10. The process of bending a band saw through its entire length in one direction to equalize the fibre stress in one face and of bending its entire length in the reverse direction to equalize the fibre stress in the other face thereof and repeating the double bending operation, and on the last double bending operation reducing the amount of the last bend to substantially half the amount of the other bend.

11. The process of equalizing the strains in a band saw by bending consisting of passing the saw repeatedly through rolls composed of gripping and bending rolls and alternately reversing the upper and the lower faces thereof and thereby alternately stretching first one and then the other side of the saw, and on the final passage of the saw through the rolls setting the bending roll to bend the saw substantially half the amount the saw was bent on the preceding passage.

In testimony whereof I affix my signature.

OTTO MUEHLEN.